(12) United States Patent
Mackenzie et al.

(10) Patent No.: US 11,102,720 B2
(45) Date of Patent: Aug. 24, 2021

(54) USER EQUIPMENT BATTERY CONSUMPTION

(71) Applicant: British Telecommunications Public Limited Company, London (GB)

(72) Inventors: Richard Mackenzie, London (GB); Anvar Tukmanov, London (GB); Andrew Garrett, London (GB); Colin Harrold, London (GB); Michael Fitch, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 15/123,802

(22) PCT Filed: Feb. 26, 2015

(86) PCT No.: PCT/GB2015/050554
§ 371 (c)(1),
(2) Date: Sep. 6, 2016

(87) PCT Pub. No.: WO2015/132562
PCT Pub. Date: Sep. 11, 2015

(65) Prior Publication Data
US 2017/0019851 A1     Jan. 19, 2017

(30) Foreign Application Priority Data
Mar. 6, 2014 (EP) .................................. 14250037

(51) Int. Cl.
*H04W 52/02* (2009.01)
*H04W 76/28* (2018.01)

(52) U.S. Cl.
CPC ... *H04W 52/0212* (2013.01); *H04W 52/0251* (2013.01); *H04W 52/0261* (2013.01);
(Continued)

(58) Field of Classification Search
CPC ......... H04W 52/0212; H04W 52/0251; H04W 52/0261; H04W 52/0277; H04W 76/048;
(Continued)

(56) References Cited

U.S. PATENT DOCUMENTS 8,582,976 B2   11/2013   Boyd
8,588,285 B2   11/2013   Humphrey et al.
(Continued)

FOREIGN PATENT DOCUMENTS

CN   101542920 A   9/2009
CN   102804865 A   11/2012
CN   102907137 A   1/2013

OTHER PUBLICATIONS

PCT International Search Report for PCT/GB2015/050554, dated Apr. 23, 2015, 4 pages.
(Continued)

*Primary Examiner* — Mohamed A Kamara
(74) *Attorney, Agent, or Firm* — Patterson Thuente Pedersen, P.A.

(57) ABSTRACT

A method, user equipment (UE) and basestation are provided, wherein the UE is configured to send battery status data to the basestation and, in response, the basestation is adapted to improve the Quality of Service for the UE.

20 Claims, 3 Drawing Sheets

```
Battery monitor 11 records battery status     (S1)
data for the UE 10
              ↓
UE 10 sends battery status data to the        (S2)
eNodeB 20
              ↓
eNodeB receives battery status data and,      (S3)
in response, improves QoS for the UE 10
```

(52) U.S. Cl.
CPC ........ *H04W 52/0277* (2013.01); *H04W 76/28* (2018.02); *Y02D 30/70* (2020.08)

(58) Field of Classification Search
CPC ... H04W 76/28; Y02D 70/00; Y02D 70/1262; Y02D 70/24
See application file for complete search history.

(56) References Cited

U.S. PATENT DOCUMENTS

| | | | | |
|---|---|---|---|---|
| 2003/0190938 | A1* | 10/2003 | Ganton | H04W 52/00 455/574 |
| 2006/0215559 | A1* | 9/2006 | Mese | H04W 52/265 370/232 |
| 2007/0072565 | A1* | 3/2007 | Yach | H04W 52/0261 455/127.1 |
| 2007/0091836 | A1 | 4/2007 | Oprescu-Surcobe et al. | |
| 2008/0057894 | A1* | 3/2008 | Aleksic | H04W 52/0258 455/187.1 |
| 2008/0227399 | A1 | 9/2008 | Nagata et al. | |
| 2010/0317379 | A1 | 12/2010 | Gupta | |
| 2010/0323753 | A1* | 12/2010 | Imamura | H04W 52/0277 455/552.1 |
| 2011/0211466 | A1 | 9/2011 | Kazmi | |
| 2011/0268000 | A1 | 11/2011 | Kashikar et al. | |
| 2011/0294456 | A1* | 12/2011 | Anderson | H04W 28/0268 455/404.1 |
| 2013/0039179 | A1* | 2/2013 | Chapman | H04L 47/41 370/230.1 |
| 2013/0250908 | A1* | 9/2013 | Bach | H04W 52/0206 370/331 |
| 2013/0308520 | A1 | 11/2013 | Damnjanovic | |
| 2013/0339772 | A1* | 12/2013 | Yu | G06F 1/3206 713/323 |
| 2017/0126899 | A1 | 5/2017 | Linney et al. | |

OTHER PUBLICATIONS

PCT Written Opinion of the International Searching Authority for PCT/GB2015/050554, dated Apr. 23, 2015, 6 pages.
European Search Report for Ep 14250037.0-1855, dated Oct. 7, 2014, 8 pages.
International Preliminary Report on Patentability for PCT/GB2015/050554, dated May 20, 2016, 15 pages.
Intel: "Clarifying the, Impact of PPI on QoS", 3GPP Draft; R2-125751Clarifying the Impact of PPI on QOS. 3rd Generation Partnership Project (3GPP), Mobile Competence Centre ; 650, Route Des Lucioles ; F-006921 Sophia-Antipolis Cedex ; France , vol. RAN WG2, No. New Orleans; Nov. 12, 2012-Nov. 15, 2012 Nov. 3, 2012 (Nov. 3, 2012), XP050667488, Retrieved from the Internet: URL:http://www.3gpp.org/ftp/tsg_ran/WG2_RL2/TSGR2_80/Docs/ [retrieved on Nov. 10, 2012].
Nec et al: "Prohibit timer FFS for LTE EDDA", 3GPP Draft; R2-125720_REL11_LTE_EDDA_Disc_Prohibittime RFFS, 3rd Generation Partnership Project (3GPP), Mobile Competence Centre ; 650, Route Des Lucioles ; F-06921 Sophia-Antipolis Cedex ; France , vol. RAN WG2, No. New Orleans, Louisiana; Nov. 12, 2012-Nov. 16, 2012 Nov. 2, 2012 (Nov. 2, 2012), XP050667301, Retrieved from the Internet; URL:http://www.3gpp.org/ftp/tsg_ran/WG2_RL2/TSGR2_80/Docs/ [retrieved on Nov. 2, 2012].
Samsung; "Assistance information from UE to eNB for eDDA", 3GPP Draft; R2-121465, 3RD Generation Partnership Project (3GPP), Mobile Competence Centre ; 650, Route Des Lucioles ; F-06921 Sophia-Antipolis Cedex ; France, vol. RAN WG2, No. Jeju, Korea; Mar. 26, 2012-Mar. 30, 2012, Mar. 19, 2012 (Mar. 19, 2012), XP050605996.
European Search Report for corresponding International Application No. 15708259.5 dated Sep. 28, 2017; 5 pages.
Philips: "Capabilities of multi-transceiver UEs", 3GPP TSG RAN WG2 #70bis, R2-103922; Stockholm, Sweden, Jun. 28-Jul. 2, 2010, 3rd Generation Partnership Project (3GPP), Mobile Competence Centre ; 650, Route Des Lucioles ; F-06921 Sophia-Antipolis Cedex; France, val.; Jun. 23, 2010; 3 pages.
LG Electronics Inc: "UE implementation aspect for PPI triggering", Agenda item: 7.2.1; 3GPP TSG-RAN WG2 #80 R2-125603; Mobile Competence Centre ; 650, Route Des Lucioles; F-06921 Sophia-Antipolis Cedex; France val. Nov. 16, 2012 (Nov. 16, 2012), 2 pages.
Great Britain Search Report, Application No. GB1615036.9, dated Mar. 6, 2020, 2 pages.
English Translation of Chinese Office Action and Search Report, Application No. 201580012155.X, dated Jan. 15, 2020, 10 pages.
English Translation of Chinese Search Report, Application No. 201580012155.X, dated Jun. 5, 2019, 2 pages.
Great Britain Examination Report, Application No. GB1615036.9, dated Jun. 9, 2020, 3 pages.
Philips, "Capabilities of multi-transceiver UEs" 3GPP Draft; R2-103922 Dynamic capability signalling for multi-transceiver UEs, Jun. 23, 2010, 3rd Generation Partnership Project (3GPP), Mobile Competence Centre; 650, route des Lucio/es; F-06921 Sophia-Antipolis Cedex; France.
Translation of Chinese Decision of Rejection, Application No. 201580012155.X, dated Aug. 3, 2020, 8 pages.
English Translation of Office Action dated Mar. 30, 2021 for Chinese Application No. 201580012155.X, 5 pages.

* cited by examiner

USER EQUIPMENT BATTERY CONSUMPTION

CROSS-REFERENCE TO RELATED APPLICATIONS

The present application is a National Phase entry of PCT Application No. PCT/GB2015/050554, filed on 26 Feb. 2015, which claims priority to EP Patent Application No. 14250037.0, filed on 6 Mar. 2014, which are hereby fully incorporated herein by reference.

TECHNICAL FIELD

The present disclosure relates to a mobile telecommunications network. In particular, this invention relates to controlling User Equipment (UE) in a mobile telecommunications network.

BACKGROUND

User Equipment (UE) battery lifetime is a major concern for mobile telecommunications networks, which has become a bigger problem with the rising popularity of smartphones. Smartphones, like many forms of UE, have become powerful mobile computing devices such that users now expect great processing power and large displays. However, UEs have had to compromise on their battery lifetimes due to the increased battery consumption and the design constraints on the battery's size and weight. There is therefore a need to balance the UE's performance with battery lifetime.

Conventionally, this balance of UE performance and battery life has been addressed by the UE having adjustable power consumption settings (such as reducing the processing power of the UE, reducing the screen brightness etc.). In addition, mobile telecommunications network operators (MNOs) have also been able to reduce the battery consumption of UEs, such as by adjusting mobile connectivity parameters. These techniques have generally been employed when the UE has a low battery level, such that the UE optimizes performance for a majority of the battery's lifetime and, if the UE is in a low battery state, it attempts to extend the battery life.

In one example, LTE Release 11 includes a feature 'Enhancement for Diverse Data Applications' (EDDA) which allows the UE to inform the MNO of its battery consumption preference. The two options are "Normal", such that the UE and MNO will operate normally, or "LowPowerConsumption". The LTE standards do not specify how the MNO may react to the LowPowerConsumption message, but it may be, for example, by adjusting mobile connectivity parameters.

The present inventors have identified that the balance between UE performance and UE battery life can be further optimized.

SUMMARY

According to a first aspect of the disclosure, there is provided a method for controlling a User Equipment (UE) in a mobile telecommunications network, the network including a basestation, the method comprising: a basestation receiving battery status data from a UE, wherein the battery status data indicates a user-inputted preference for the UE's battery consumption; and, in response, the basestation improving the Quality of Service (QoS) for the UE.

The present disclosure provides a method that allows the user to tailor the UE's performance and battery consumption balance by improving its QoS. The user may therefore compromise the battery lifetime of a UE in order to increase its performance. Thus, the user has more flexibility over the UEs performance, which may be more desirable as UE processing power increases. In one example, the UE may transmit a signal to the basestation (such as by an extension of the Enhancement for Diverse Data Applications (EDDA) feature of LTE Release 11) indicating a remaining battery life of the UE and/or a charging status of the UE, and the basestation may respond to improve the QoS for the UE.

The user preference may indicate that a QoS for a particular parameter (e.g. delay or throughput) and/or service (such as voice or data) may be improved, and the basestation may react by improving the QoS for that parameter and/or service and maintaining QoS for others. The UE's performance and battery consumption balance may therefore be further tailored. The basestation may improve the QoS by adjusting connectivity parameters for the UE. Thus, the basestation may adjust the time period for a UE to enter Idle Mode, and/or the power down interval in Connected DRX Mode, to improve the QoS for the device.

According to a second aspect of the disclosure, there is provided a basestation for a mobile telecommunications network including a User Equipment (UE) the basestation comprising a transceiver adapted to communicate with a UE; and a processor adapted to control communications between the transceiver and the UE, wherein the transceiver is further adapted to receive battery status data from the UE, wherein the battery status data indicates a user-inputted preference for the UE's battery consumption and the processor is further adapted to improve the Quality of Service (QoS) for the UE in response to the received battery status data. The basestation may be an eNodeB or a small cell (such as a femtocell, picocell, microcell or metrocell).

According to a third aspect of the disclosure, there is provided a User Equipment (UE) for a mobile telecommunications network, the network including a basestation, the UE comprising a user interface configured to receive a user input on the user's preference for the UE's battery consumption; a battery; a battery monitor adapted to store status data of the battery; and a transceiver adapted to transmit the battery status data to a basestation for improved Quality of Service (QoS) for the UE, wherein the battery status data indicates the user-inputted preference for the UE's battery consumption.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
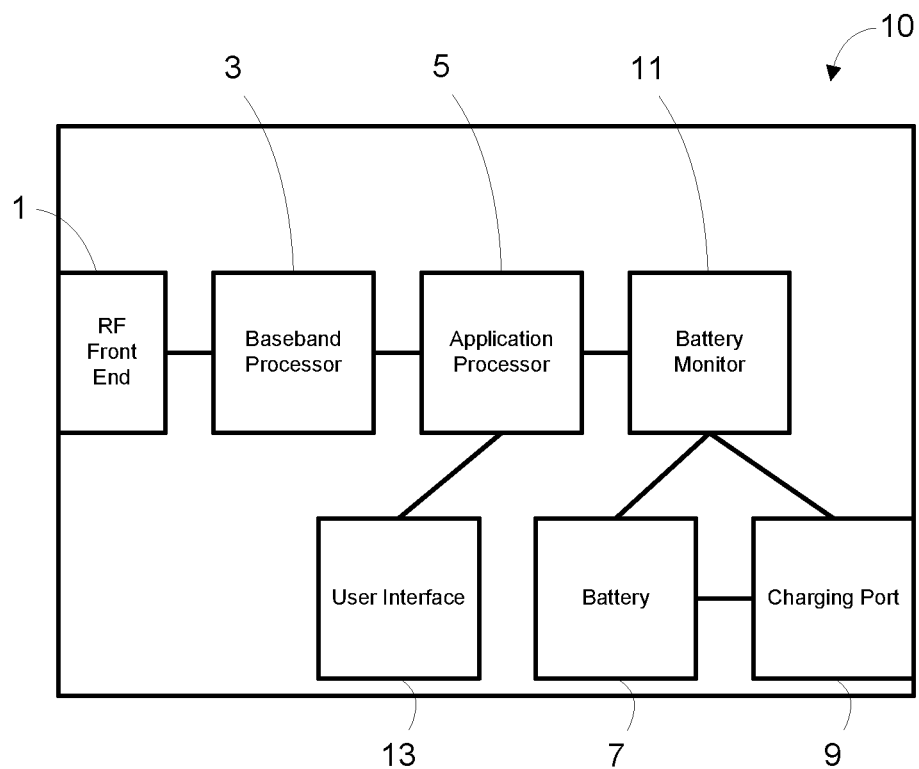
FIG. 1 is a schematic diagram of a User Equipment (UE) of a first embodiment.

A first embodiment of the present disclosure will now be described with reference to FIGS. 1 to 3. FIG. 1 is a schematic diagram of a User Equipment (UE) 10 of the first embodiment of the present disclosure. The UE 10 includes an RF front end 1, a baseband processor 3, an application processor 5, a battery 7, a charging port 9, a battery monitor 11 and a user interface 13. As is known in the art, the RF front end 1 is a transceiver adapted to send and receive RF signals, the baseband processor 3 acts as a mobile termination component adapted to perform common RF transmission functions (e.g. encoding, decoding, error detection etc.), and the application processor acts as a terminal equipment component adapted to process high level functions. In this embodiment, the baseband processor 3 is adapted for communications in accordance with the LTE protocol stack (i.e. L1, MAC, RLC, PDCP, RRC).

The battery 7 is connected to the charging port 9 such that it may be periodically recharged by the user. The UE 10 also includes a battery monitor 11 adapted to measure and record data relating to a status of the battery. For example, the battery monitor 11 may measure the remaining battery life of the battery 7 (e.g. in milliWatt hours, as a percentage of the remaining battery life, as an estimated battery lifetime, or a relative value (low, medium or high)), and may determine its charging status (e.g. by monitoring the charging port 9), and record this battery status data in memory (not shown).

The RF front end 1, baseband processor 3, application processor 5 and battery monitor 11 are connected such that the UE may transmit the battery status data. The UE also includes a user interface 13, such as a screen and/or keyboard. The user interface 13 allows the user to input user preferences (explained in more detail below).

Figure 2:
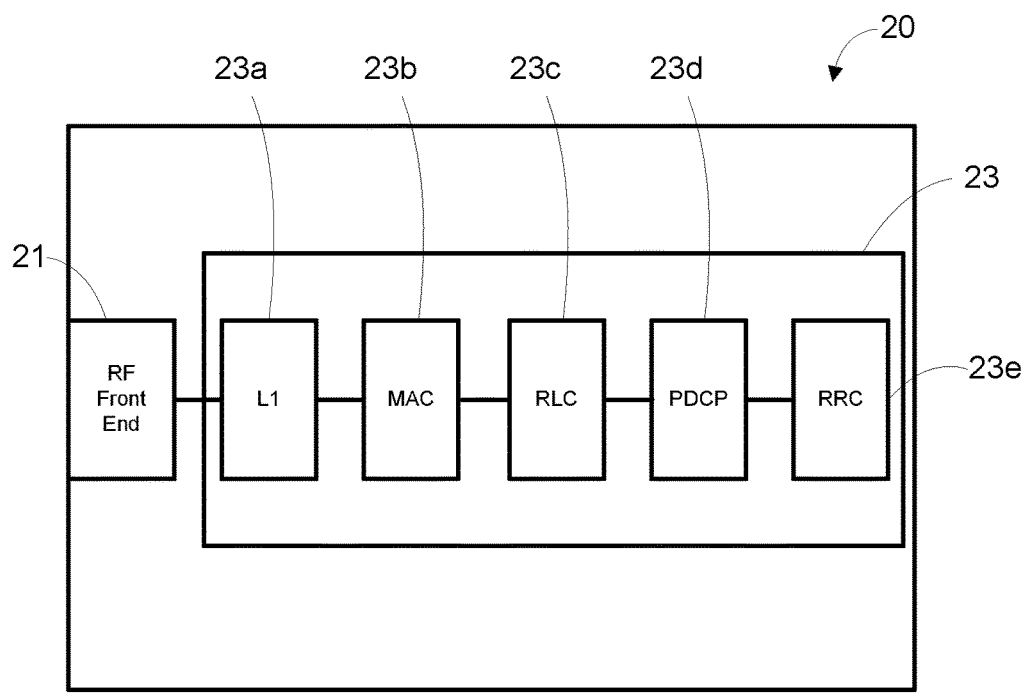
FIG. 2 is a schematic diagram of an eNodeB of the first embodiment.

FIG. 2 is a schematic diagram of an eNodeB 20 of the first embodiment of the present disclosure. The eNodeB 20 includes an RF front end 21 adapted to send and receive RF signals, and a processor 23 adapted to process any received RF signals and configure any signals for transmission. In this embodiment, the processor 23 is adapted to process signals across the protocol stack, shown as various processing modules L1 23a, Medium Access Control 23b, Radio Link Control 23c, Packet Data Convergence Protocol 23d and Radio Resource Control Layer 23e.

In this embodiment, the RF front end 21 may receive a signal including battery status data from the UE 10, and the Radio Resource Control Layer, RRC, module 23e is adapted to process this data. The processor 23 is adapted to implement a method of the present disclosure such that it may react to a signal including battery status data from the UE 10 by improving the QoS for the UE 10. A first embodiment of the method of the present disclosure will now be described with reference to FIG. 3.

Figure 3:
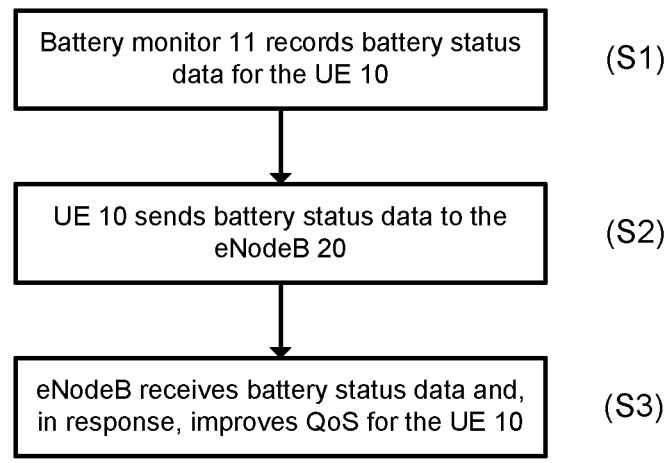
FIG. 3 is a flow diagram illustrating a first embodiment of the method of the present disclosure.

FIG. 3 is a flow diagram illustrating a method of the first embodiment of the present disclosure. As a first task, the battery monitor 11 records battery status data for the UE 10, such as the remaining battery life of the UE 10 and the charging status (S1). The UE 10 determines that its performance may be improved at a compromise to the battery consumption, and sends the battery status data to the eNodeB 20 (via the RF front end 1, application processor 5 and baseband processor 3) in order to improve its Quality of Service, QoS (S2).

In this embodiment, the battery status data is encoded in a modified version of the 'Enhancement for Diverse Data Applications', EDDA, message. The skilled person will understand that LTE Release 11 specifies a 'UEAssistanceInformation' message (defined in 3GPP Technical Specification 36.331), which may contain a 'PowerPrefIndicator' element having options 'Normal' or 'LowPowerConsumption'. The standard message includes the following parameter:

```
UEAssistanceInformation-r11-IEs {
    powerPrefIndication-r11 ENUMERATED {normal,
    lowPowerConsumption}
OPTIONAL,
    ...
}
```

Thus, the modified EDDA message of the present disclosure may include further indications relating to battery consumption (such as 'very high', 'high', or 'very low'), such that the message includes:

```
UEAssistanceInformation-r11-IEs {
    powerPrefIndication-r11 ENUMERATED {very high, high, normal,
lowPowerConsumption, very low} OPTIONAL,
    ...
}
```

Furthermore, the EDDA message may be modified to include further indications, such as relative changes in battery consumption ('much higher', 'higher', 'same', 'lower, 'much lower'); a battery status description ('low', 'medium', 'high); a battery status percentage ('0%' . . . '100%'); a battery lifetime in remaining hours (e.g. 'x hrs'); a battery lifetime in mWh (e.g. '100 mWh'), and/or a battery charging status ('charging', 'not charging'). The message details may therefore include:

```
UEAssistanceInformation-r11-IEs {
    powerPrefIndication-r11 ENUMERATED {very high, high, normal,
lowPowerConsumption, very low} OPTIONAL,
    powerPrefIndication-Relative ENUMERATED {much higher, higher,
same, lower, much lower} OPTIONAL,
        batteryStatusDescription ENUMERATED {low, medium, high}
        OPTIONAL,
        batteryStatusPercentage ENUMERATED {0... 100} OPTIONAL,
        batteryStatusRemainHours ENUMERATED {0...} OPTIONAL,
        batteryStatusRemainHours_mWh ENUMERATED {0...}
        OPTIONAL,
        chargeStatus ENUMERATED {charging, not_charging}
        OPTIONAL,
    ...
}
```

The eNodeB 20 receives the battery status data at the RF front end 21, which is then processed by the processor 23 and, in response, the processor 23 is configured to improve the QoS for the UE 10 (step S3). In this embodiment, the EDDA messages are processed by the RRC 23e, which then improves the QoS for the UE 10. The skilled person will understand that this may be implemented in several ways, and the following description relates to examples of how this may be achieved.

In one example, the RRC module 23e improves the QoS for the UE 10 by adjusting connectivity parameters for the UE 10. The RRC module 23e therefore adjusts the value for the Idle Mode and Connected DRX Mode timers in order to optimize performance and sacrifice battery consumption. The skilled person will understand that Idle Mode is used by the UE 10 when it has no active connections. The UE 10 moves between Idle Mode and a Connected Mode at regular intervals. The length of this interval can be adjusted by the RRC module 23e to optimize performance.

In Connected DRX Mode, the UE 10 stays in Connected Mode, but powers down for short intervals. The length of this interval can also be adjusted by the RRC module 23e to optimize performance (e.g. by reducing the interval or keeping the UE 10 in Connected Mode at all times).

In another example, the RRC module 23e may balance the load on the network to improve the QoS for the UE 10. For example, the RRC module 23e may move the UE 10 from a heavily loaded cell to a cell that requires a higher uplink power, but has more available capacity. This improves the QoS for the UE 10 by giving it access to more capacity.

In a further example, the RRC module 23e improves the QoS for the UE 10 through network power management. For example, if the UE 10 is able to transmit at higher powers, then a nearby cell may be put into sleep mode so the UE 10 attaches to a more distant neighbor (requiring a greater uplink power). The reduced interference (from having fewer cells transmitting in the area) can increase the capacity available to the UE 10, thus improving the QoS. Furthermore, if the battery level falls below a particular threshold, a nearby cell may be brought out of sleep mode so the UE 10 may maintain QoS whilst reducing its transmit power.

The UE 10 and eNodeB 20 may then send and receive signals using the new connection parameters and improved QoS.

A second embodiment of the method of the present disclosure will now be described. In this embodiment, the UE 10 is also configured to send indications regarding user preferences to the eNodeB 20. These user preferences may specify how the UE 10 should balance performance and battery consumption for different parameters. For example, the UE 10 may be configured to send battery status data to the eNodeB 20, the data including user preferences that the QoS for one service, e.g. voice, should be improved at the expense of battery life, whist the QoS for all other services should be maintained at the current level.

In another configuration, the user preferences may specify that QoS should be optimized for particular connectivity parameters, such as delay or throughput, at the expense of battery life. Furthermore, the user preferences may specify that QoS should be optimized for particular services and/or connectivity parameters, depending on the current battery status, for example:

| Battery Status | User Preference |
| --- | --- |
| 20% or below | Maximize battery at expense of throughput |
| 20% to 50% | Prefer throughput to battery |
| 50% to 80% | Maximize throughput for voice at expense of battery |
| 80% to 100% | Maximize throughput for voice and data at expense of battery |
| Charging | Maximize throughput at expense of battery |

The user may input these preferences via the user interface 13 on the UE 10, which may then be transmitted by the RF front end 1 (via the application and baseband processors 3, 5) to the eNodeB 20. Alternatively, the user may indicate that improved QoS is required, and the UE 10 may react by setting appropriate user preferences and sending them to the eNodeB 20. The UE 10 may be configured such that the battery status data is sent to the eNodeB 20 on demand by the user. The UE 10 may also send the battery status data to the eNodeB 20 periodically.

The modified UEAssistanceInformation message is a suitable way for the battery status data to be sent to the eNodeB in LTE systems. These messages may be created by adding additional features (e.g. measurement and memory) into the battery, charging port and battery monitor, and configuring the RRC layer of the baseband processor (or they can be generated by the application processor). The messages may be received and processed directly by the eNodeB RRC module, or alternatively the messages may be indirectly routed to the RRC module (e.g. an application on the UE may communicate with a server on the internet or core network, which then communicates with the eNodeB). However, the skilled person will understand that the present disclosure is not limited to this particular message or to LTE systems. Thus, the method may use any type of signal to send the battery status data, and the eNodeB may be any form of basestation (such as a small cell).

Furthermore, the present disclosure is not limited to the RRC layer processing the battery status data. That is, any processor within the basestation may process the battery status data and improve the QoS for the UE 10.

The skilled person will also understand that the basestation may improve the QoS for the UE in a variety of ways, and the description of optimizing connectivity parameters for the UE in the embodiments above are just examples of how this may be achieved.

The skilled person will understand that any combination of features is within the scope of the present disclosure, as claimed.

The invention claimed is:

1. A method for controlling a User Equipment (UE) in a mobile telecommunications network, the network including a basestation, the method comprising:
   a basestation receiving battery status data from a UE, wherein the battery status data indicates a user-inputted preference for a particular service, a particular parameter, or both, and a user-inputted preference for a relative UE battery consumption, the relative UE battery consumption including at least one of a plurality of possible states of consumption compared to a current consumption level of the UE; and, in response
   the basestation improving the Quality of Service (QoS) for the UE by adjusting connectivity parameters according to the user-inputted preference for the particular service, the particular parameter, or both, and the user-inputted preference for the relative UE battery consumption and sacrificing battery consumption.

2. The method as claimed in claim 1, wherein the battery status data indicates a remaining battery life of the UE.

3. The method as claimed in claim 1, wherein the battery status data indicates a charging status of the UE.

4. The method as claimed in claim 1, wherein the user-inputted preference is for a UE's battery consumption for a particular service.

5. The method as claimed in claim 1, wherein the battery status data includes at least one of a plurality of at least three states for a battery status parameter.

6. The method as claimed in claim 1, wherein the user-inputted preference for a particular service, a particular parameter, or both includes QoS preferences according to a plurality of ranges of a current battery status.

7. The method as claimed in claim 1, wherein the basestation improves the QoS for the UE by adjusting connectivity parameters including by adjusting an interval in which the UE is in an Idle Mode or adjusting an interval in which the UE is in a Connected Mode.

8. The method as claimed in claim 1, wherein the basestation improves the QoS for the UE by adjusting connectivity parameters including by moving the UE to a cell requiring greater uplink power than the uplink power required at a current cell, and wherein the battery consumption is increased.

9. The method as claimed in claim 1, wherein the basestation further improves the QoS for the UE by deactivating a neighboring cell.

10. The method as claimed in claim 7, wherein the interval in which the UE is in a Connected Mode is reduced, and wherein the battery consumption is increased.

11. A basestation for a mobile telecommunications network including a User Equipment (UE) the basestation comprising:
a transceiver adapted to communicate with a UE; and
a processor adapted to control communications between the transceiver and the UE, wherein the transceiver is further adapted to receive battery status data from the UE, wherein the battery status data indicates a user-inputted preference for a particular service, a particular parameter, or both, and a user-inputted preference for a relative UE battery consumption, the relative UE battery consumption including at least one of a plurality of possible states of consumption compared to a current consumption level of the UE, and the processor is further adapted to improve the Quality of Service (QoS) for the UE by adjusting connectivity parameters for the UE according to the user-inputted preference for the particular service, the particular parameter, or both, and the user-inputted preference for the relative UE battery consumption and sacrificing battery consumption in response to the received battery status data.

12. The basestation as claimed in claim 11, wherein the battery status data indicates a remaining battery life of the UE.

13. The basestation as claimed in claim 11, wherein the battery status data indicates a charging status of the UE.

14. The basestation as claimed in claim 11, wherein the user-inputted preference is for the UE's battery consumption for a particular service.

15. The basestation as claimed in claim 11, being an eNodeB.

16. The basestation as claimed in claim 11, being a small cell.

17. A User Equipment (UE) for a mobile telecommunications network, the network including a basestation, the UE comprising:
a user interface configured to receive a user input on the user's preference for the UE's battery consumption;
a battery;
a battery monitor adapted to store status data of the battery; and
a transceiver adapted to transmit the battery status data to a basestation for improved Quality of Service (QoS) for the UE, wherein the battery status data indicates the user-inputted preference for a particular service, a particular parameter, or both, and a user-inputted preference for a relative UE battery consumption, the relative UE battery consumption including at least one of a plurality of possible states of consumption compared to a current consumption level of the UE, and wherein the improved QoS for the UE is achieved by the basestation adjusting connectivity parameters for the UE according to the user-inputted preference for the particular service, the particular parameter, or both, and the user-inputted preference for the relative UE battery consumption and sacrificing battery consumption.

18. The UE as claimed in claim 17, wherein the battery status data indicates a remaining battery life of the UE.

19. The UE as claimed in claim 17, wherein the battery status data indicates a charging status of the UE.

20. The UE as claimed in claim 17, wherein the user preference is for the UE's battery consumption for a particular service.

* * * * *